F. KOSKUL.
Manufacture of Tiles and other Articles in Imitation Intarsia.

No. 222,286.              Patented Dec. 2, 1879.

United States Patent Office.

FREDERICK KOSKUL, OF GRAND RAPIDS, MICHIGAN.

IMPROVEMENT IN THE MANUFACTURE OF TILES AND OTHER ARTICLES IN IMITATION INTARSIA.

Specification forming part of Letters Patent No. 222,286, dated December 2, 1879; application filed May 10, 1879.

*To all whom it may concern:*

Be it known that I, FREDERICK KOSKUL, of Grand Rapids, in the county of Kent and State of Michigan, have invented certain new and useful Improvements in the Manufacture of Tiles and other Articles in Imitation Intarsia; and I do hereby declare that the following is a full, clear, and exact description of the invention, which will enable others skilled in the art to which it appertains to make and use the same, reference being had to the accompanying drawings, which form a part of this specification, and in which—

Figure 1:
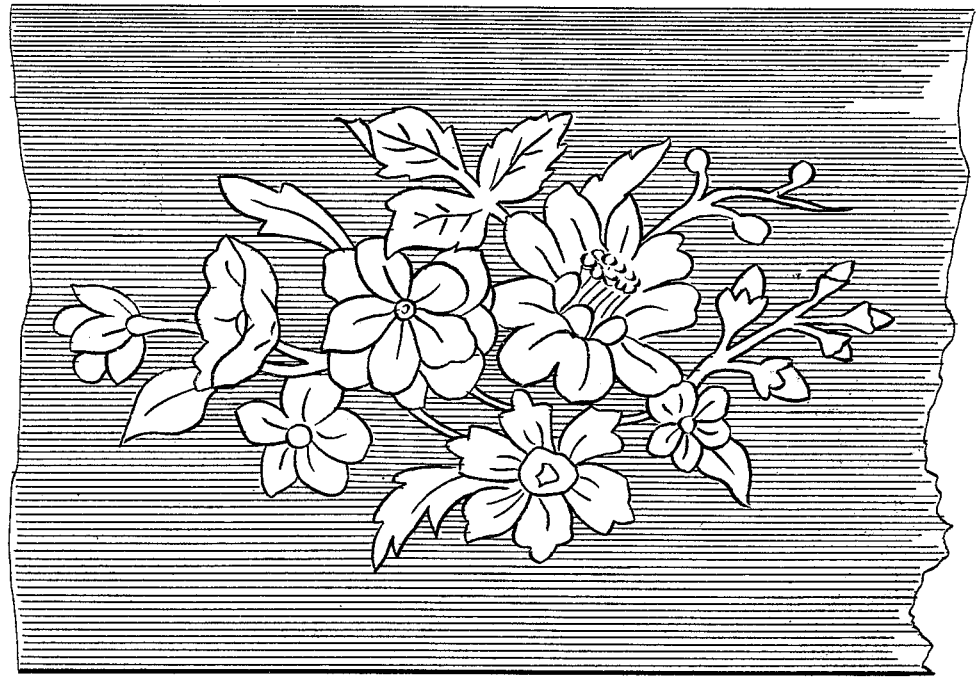
Figure 2:
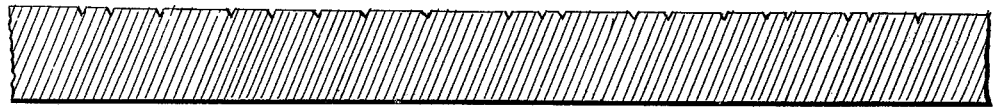
Figure 3:

Figure 1 is a plan view of a plaque or panel with an imitation-intarsia surface. Fig. 2 is a section of the mold or matrix; and Fig. 3 is a similar section, showing a modification in the construction of the mold or matrix.

Similar letters of reference indicate corresponding parts in all the figures.

This invention relates to the production, as distinctive articles of manufacture, of tiles, table-tops, wainscoting, panels, work-boxes, articles of furniture of all kinds, and fancy, luxury, or ornamental articles generally, by the process described in the Letters Patent of the United States No. 214,826, granted to me on the 29th day of April, 1879, a brief résumé of which said process is as follows:

A mold or matrix is first prepared, of metal, slate, or any suitable material, and of suitable size and construction, in the bottom of which, or in the bottom and sides of which, the outlines of the ornament or ornaments with which the finished article is to be embellished are depressed, sunk, engraved, or intagliated. Into the mold or matrix thus prepared I place the material, compound, or composition which is to form the base of the manufactured article. If this is to be an ornamental plaque, or a tile, for example, clay, plaster-of-paris, or any artificial-stone compound may be used, which is pressed into the mold, so that the intagliated lines in this will appear upon the plaque or tile, when this is withdrawn from the mold, as outlines of relief.

Almost any material, compound, or composition is capable of being used with and ornamented by this process, such as plastic materials or compounds, stone, wood, cast metal, or any sheet metal or metallic foil, such materials as are not themselves capable, on account of hardness, of receiving an impression in the mold or matrix being first covered or coated with a compound of a soft or plastic nature. Wood, by being steamed, boiled, or treated in several other well-known ways, is adapted for ornamentation by this process, either plain or veneered, and with or without a plastic coating of varnish, shellac, or any suitable paint composition.

In the treatment of some materials it is desirable to construct the matrix in the shape of rollers, one of which has a flat surface, and the other provided with indented or engraved lines, which will form the outlines in relief upon the material passed between them. When a hollow mold or matrix is used, this may be constructed as represented in Fig. 3—that is, with a raised or depressed part, *a*, forming either a shoulder, as indicated by the full line, or a recess, as indicated by the dotted lines, at each end of said figure, which shoulder or recess, as the case may be, surrounds the engraved or intagliated bed of the mold, by which the ground or real surface of the article or material to be ornamented will be exposed in its natural state. By either of these methods a base may be used which consists of several parts or layers, which allows of an endless combination and variety of materials adapted to be used by my process in the production of imitation-intarsia articles of manufacture, or articles of any kind ornamented by this process.

After the base has been produced with lines in relief in the manner described, and the spaces within the lines filled in with enamel, paint, or any suitable colored composition, and the surface rubbed down smooth, and varnished, if desired, as fully set forth in my patent above referred to, the article so prepared, if of clay and ornamented with mineral colors or enamel, is baked to give it the requsite degree of hardness and durability and bring out the colors. The subsequent treatment of the ornamented articles will, of course, differ according to their nature and the purposes for which they are intended; but the process of producing the raised outlines and subsequent filling in with coloring-matter is in all cases substantially the same.

The herein-described process being claimed by me in a prior patent, I do not, of course, make any claim thereto in this present application, but have merely described it in order that the exact character and nature of the articles produced thereby, which, as such, form the subject of my present claim, may be properly understood; hence What I hereby claim as my invention, and desire to secure by Letters Patent of the United States, is—

Imitation-intarsia articles of manufacture, consisting of a body or base of any suitable material provided with outlines in relief and with coatings of coloring-matter, divided into separate adjacent sections to produce ornamental effect by the said raised outlines, the whole surface being rubbed down to form a smooth and even exterior, with or without a superimposed layer of varnish or other hard and transparent matter, substantially as set forth.

In testimony that I claim the foregoing as my own I have hereto affixed my signature in presence of two witnesses.

FREDERICK KOSKUL.

Witnesses:
 JAMES M. WILCOX,
 HENRY H. HOLTON.